United States Patent

Masaki

[11] Patent Number: 5,930,812
[45] Date of Patent: Jul. 27, 1999

[54] WORD PROCESSING APPARATUS WHICH ADJUSTS CHARACTER OUTPUT POSITION

[75] Inventor: Katsumi Masaki, Sagamihara, Japan

[73] Assignee: Canon Kabushiki Kaisha, Tokyo, Japan

[21] Appl. No.: 08/371,441

[22] Filed: Jan. 11, 1995

Related U.S. Application Data

[63] Continuation of application No. 08/055,784, May 3, 1993, abandoned, which is a continuation of application No. 07/763,425, Sep. 20, 1991, abandoned, which is a continuation of application No. 07/698,322, May 6, 1991, Pat. No. 5,162,993, which is a continuation of application No. 07/320,826, Feb. 9, 1989, abandoned, which is a continuation of application No. 07/004,267, Jan. 6, 1987, abandoned, which is a continuation of application No. 06/603,982, Apr. 25, 1984, abandoned, which is a continuation of application No. 06/304,968, Sep. 23, 1981, abandoned.

[30] Foreign Application Priority Data

Sep. 29, 1980 [JP] Japan .................................. 55-135563
Sep. 29, 1980 [JP] Japan .................................. 55-135564

[51] Int. Cl.$^6$ ........................................................ G06F 3/14
[52] U.S. Cl. ............................................................ 707/519
[58] Field of Search ..................................... 395/100, 102, 395/111, 780; 707/517, 518, 519, 524

[56] References Cited

U.S. PATENT DOCUMENTS

| | | | |
|---|---|---|---|
| 3,654,611 | 4/1972 | Bluethman et al. | 395/780 |
| 3,999,168 | 12/1976 | Findley et al. | 364/DIG. 1 |
| 4,007,442 | 2/1977 | Findley et al. | 395/DIG. 2 |
| 4,031,519 | 6/1977 | Findley | 395/DIG. 2 |
| 4,138,719 | 2/1979 | Swanstrom et al. | 364/200 |
| 4,181,973 | 1/1980 | Tseng | 340/751 X |
| 4,185,930 | 1/1980 | Umeda et al. | 400/320 |
| 4,189,727 | 2/1980 | Vaughn, Jr. | 364/900 X |
| 4,193,119 | 3/1980 | Arase et al. | 364/900 |
| 4,228,507 | 10/1980 | Leban | 340/751 X |
| 4,298,957 | 11/1981 | Duvall et al. | 340/751 X |
| 4,310,840 | 1/1982 | Williams et al. | 364/900 |
| 4,330,217 | 5/1982 | Churgovich et al. | 400/64 |
| 4,394,693 | 7/1983 | Shirley | 395/102 |
| 4,403,301 | 9/1983 | Fessel | 395/111 |
| 4,428,065 | 1/1984 | Duvall et al. | 364/900 |
| 4,907,193 | 3/1990 | Masaki | 364/900 |

FOREIGN PATENT DOCUMENTS

| | | | |
|---|---|---|---|
| 0049767 | 10/1978 | Japan | 340/751 |
| 0083928 | 12/1978 | Japan | 340/751 |

OTHER PUBLICATIONS

Toshiba Japanese Word Processor JW–10 Operator's Guide and partial English translation.

*Primary Examiner*—Thomas M. Heckler
*Attorney, Agent, or Firm*—Fitzpatrick, Cella, Harper & Scinto

[57] ABSTRACT

A word processing apparatus capable of automatically handling characters of which use is inhibited at the head or end of a row. Such inhibited character processing can be verified on a cathode ray tube, and is applied only to the locations selected by the operator with a cursor. The character rows after such inhibited character processing can be made uniform by character pitch adjustment.

15 Claims, 13 Drawing Sheets

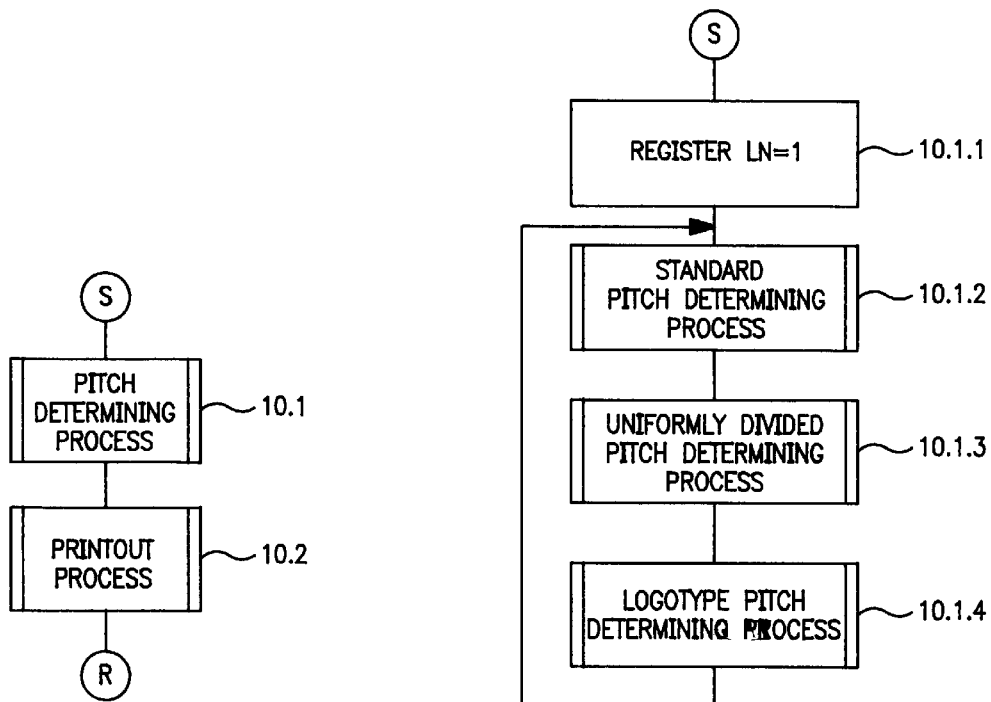
FIG. IIA
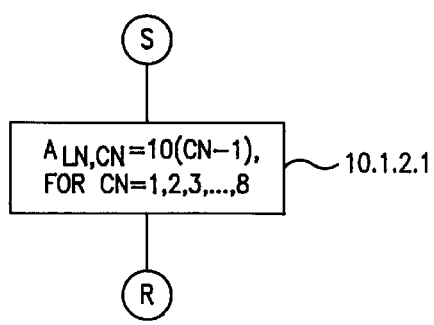
FIG. 10
FIG. 12

WORD PROCESSING APPARATUS WHICH ADJUSTS CHARACTER OUTPUT POSITION

This application is a continuation of application Ser. No. 08/055,784 filed May 3, 1993, now abandoned, which is a continuation of application Ser. No. 07/763,425 filed Sep. 20, 1991 now abandoned, which is a continuation of application Ser. No. 07/698,322 filed May 6, 1991 which issued as U.S. Pat. No. 5,162,993 on Nov. 10, 1992, which is a continuation of application Ser. No. 07/320,826 filed Feb. 9, 1989 now abandoned, which is a continuation of application Ser. No. 07/004,267 filed Jan. 6, 1987 now abandoned, which is a continuation of application Ser. No. 06/603,982 filed Apr. 25, 1984 now abandoned, which is a continuation of application Ser. No. 06/304,968 filed Sep. 23, 1981 now abandoned.

BACKGROUND OF THE INVENTION

1. Field of the Invention

The present invention relates to a word processing apparatus for electronic processing of rows of characters.

2. Description of the Prior Art

There is already known an apparatus for printing characters in uniform rows within a given area, as exemplified by the word processing apparatus disclosed in Japanese Patent Application 127203/1979. Such apparatus, however, simply divides the given area by the number of desired rows or said number minus one in allotting the rows of characters in said area, and determines the printing pitch of characters by the quotient of said division. For this reason the residual of the division is disregarded, and the resulting error becomes significant when the number of characters constituting a row increases.

The presence of such error in each row will result in unaligned end positions of the rows on a document.

Also there is known a word processing apparatus capable of automatically handling the characters of which use is inhibited for the head or end of a row.

In such apparatus, sentences for example entered from a keyboard are displayed on a cathode ray tube (CRT) for various processings such as editing. The inhibited character processing is not conducted at this stage. In response to an instruction for printout, the sentences are printed with automatic inhibited character processing.

The inhibited character processing in such apparatus is only conducted at the printout stage and can therefore be verified only on the printing paper. Consequently the actual printout obtained may differ from the expected form.

Also already known is a word processing apparatus capable of automatically conducting inhibited character processing for the head and end of rows in Japanese sentences.

In such apparatus, sentences entered for example from a keyboard are displayed on a cathode ray tube for various processings such as editing. The automatic inhibited character processing is not conducted at this stage but executed on the entire sentences before they are supplied to a printer for printout.

However the conventional apparatus is capable of over-all inhibited character processing but is incapable of applying such processing only to a part of the obtained sentences, thus being disadvantageous in providing such processing even in locations not desired by the user.

Furthermore, the known apparatus for printing uniform rows of characters in a given area, such as exemplified by the word processing apparatus disclosed in the aforementioned Japanese Patent Application 127203/1979, is unable to position a single letter in a given area. Consequently such apparatus is disadvantageous in being incapable of uniform spacing if only one character is entered in said area in the input stage.

In the present invention, in case only one character is entered in a given area, uniform spacing is achieved by printing said character in the center of said area.

In Japanese sentences, the inhibited character processing inevitably results in an increase or decrease of the number of characters in a row, giving rise to an unaesthetic printing because of the fluctuation in the characters form row to row. For this reason the pitch of characters is suitably adjusted for each row in such a manner that every row can be accommodated within a determined length.

In the conventional letterpress printing, such adjustment is achieved by manual control of the character pitch. Also in case of a dot matrix printer, the adjustment of character pitch has no standard procedure and has to be done with significant toil by the operator.

Furthermore, in the already known word processing apparatus capable of automatically handling the characters of which use is inhibited for the head or end of a row, wherein the sentences for example entered from a keyboard are displayed on a cathode ray tube for various processings such as editing, the inhibited character processing does not take place at this stage but is automatically applied when an instruction for printout is given, and the result of such processing can only be confirmed on the printing paper. For this reason it is not possible to modify such processing automatically conducted. On the other hand it is also true that such modification or correction afterwards is indispensable because of the limitation in the automatic inhibited character processing.

OBJECTS OF THE INVENTION

In consideration of the foregoing, the object of the present invention is to provide an improved word processing apparatus.

Another object of the present invention is to provide a word processing apparatus capable, in the presence of a residual R in the calculation for determining the character pitch, of increasing the pitch for the initial R characters in a row, thereby minimizing the positional error in character printing.

Still another object of the present invention is to provide a word processing apparatus capable of showing the result of inhibited character processing on a cathode ray tube, with a particular mark for each location of said process, thereby enabling and facilitating the confirmation of such processing.

Still another object of the present invention is to provide a word processing apparatus adapted for conducting inhibited character processing by inserting an inhibited character code at the end of each row, or at the end of each row in a framed area in case of character entry into such framed area, thereby enabling easy handling of such inhibited characters for sentences located in a framed area and displaying inhibited character marks representing such codes on a cathode ray tube.

Still another object of the present invention is to provide a word processing apparatus allowing the operator to select the locations of such inhibited character processing on a document, thus conducting automatic processing only in the locations required by the operator.

Still another object of the present invention is to provide a word processing apparatus allowing the operator to select, with an arbitrarily movable cursor, a row after which the inhibited character processing is applied, thereby facilitating the procedure of selecting the location of such processing.

Still another object of the present invention is to provide a word processing apparatus allowing, with a cursor, not only the leading row of such processing but also the ending row of such processing or a single row for which said processing is to be applied.

Still another object of the present invention is to provide a character processing apparatus capable of printing characters at a uniform pitch within a given area after inhibited character processing, without any burden to the operator.

Still another object of the present invention is to provide a word processing apparatus capable of limiting the range of rows subjected to the automatic uniform pitch spacing, thereby excluding certain characters of fixed printing position from said uniform pitch spacing. For example an instruction for a logo printing is present for a row subjected to the inhibited character processing, the uniform pitch spacing is initiated from a character next to said logo printing.

Still another object of the present invention is to provide a word processing apparatus allowing manual corrections, such as insertion, deletion or overwriting after the inhibited character processing.

Still another object of the present invention is to provide a word processing apparatus so structured as to fully utilize the result of inhibited character processing even when an insertion is made after said inhibited character processing.

Still another object of the present invention is to provide a word processing apparatus so structured as to fully utilize the result of inhibited character processing even when a deletion is made after said inhibited character processing. This is achieved by inserting an inhibited character code at the end of the row of said inhibited character processing or a nearby row, and, in case a character is deleted in the sentence preceding said code, by advancing the entire sentence by one character from the position of said deletion to the position of said code and generating a new inhibited character code adjacent to the first-mentioned code.

Still other object of the present invention will be made apparent from the following description of the preferred embodiments to be taken in conjunction with the attached drawings.

SUMMARY OF THE INVENTION

The present invention is directed to a method and an output apparatus capable of visually outputting a plurality of character patterns, each comprised by plural dots, by controlling an output position, in dot units, of at least one of the character patterns so as not to be adjacent to the preceding character patterns.

BRIEF DESCRIPTION OF THE DRAWINGS

FIG. 10 is a flow chart showing the input procedure of a print key;

FIG. 11A is a flow chart showing the pitch determining procedure;

FIG. 12 is a flow chart showing the standard pitch determining procedure;

DESCRIPTION OF THE PREFERRED EMBODIMENTS

Figure 1:
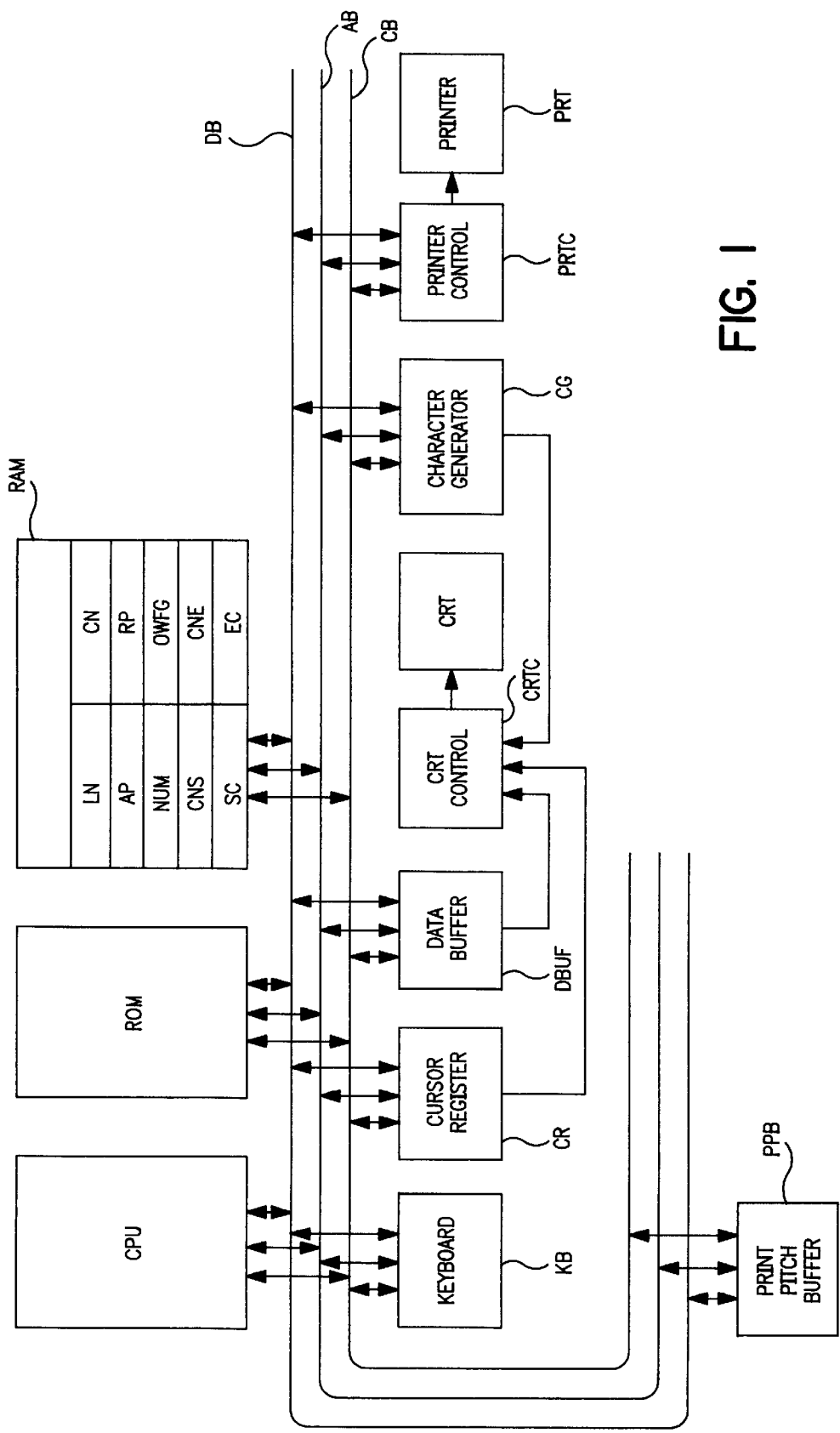
FIG. 1 is a block diagram showing an embodiment of the present invention.

At first there will be explained certain terms employed in the following description of the embodiments of the present invention:

1. Uniform division code: The uniform division code can be entered by actuating a uniform division key. A series of characters present between two uniform division codes is uniformly distributed at the printout within an area defined by said codes.

2. Logotype code: A logotype code can be entered by actuating a logotype key. A series of characters present between two logotype codes is printed with zero spacing between characters.

3. Row-head inhibited character processing: In any language, particularly in the Japanese language, certain characters or symbols will look unnatural because of grammatrical or other reason if they are positioned at the head of a row, but such characters or symbols may become positioned at the row head in the course of word processing. In such case an automatic rearrangement of the rows of characters is conducted by the actuation of a corresponding key. Examples of such characters inhibited at the row head include ")", ".", ",", "]", "}" and certain Japanese phonetic characters.

4. Row-end inhibited character processing: In any language, particularly in the Japanese language, certain characters or symbols will look unnatural because of grammatrical or other reason if they are positioned at the end of a row, but such characters or symbols may become positioned at the row end in the course of word processing. In such case an automatic rearrangement of the rows of characters is conducted by the actuation of a corresponding key. Examples of such characters inhibited at the row end include "(", "[", "{" and "$".

Now there will be outlined the embodiments of the present invention. A keyboard is utilized for entering character information and various function information, and the character information entered from said keyboard is displayed on a display unit for an editing process such as insertion, overwriting or deletion. The position of data entry on the display unit can be arbitrarily selected by a cursor controlled by cursor keys. In case of logotype printing, the partial patterns of the desired logotype are encoded, and the series of obtained codes is positioned between two logotype codes. The logotype code can be entered by a logotype key, and the above-mentioned partial pattern codes can be entered by corresponding keys provided on the keyboard.

The logotype printing is achieved with zero spacing between characters whereby the partial patterns are united to provide the desired logotype pattern.

In the case of uniformly divided printing, the area to be uniformly divided is designated by the uniform division codes between which a series of characters is entered. In this mode a space code preceding or succeeding a series of characters is not considered as a character subjected to the uniform division even when said space code is positioned between two uniform division codes. The uniform division code can be entered by the actuation of a uniform division key.

Figures 9A, 9B:
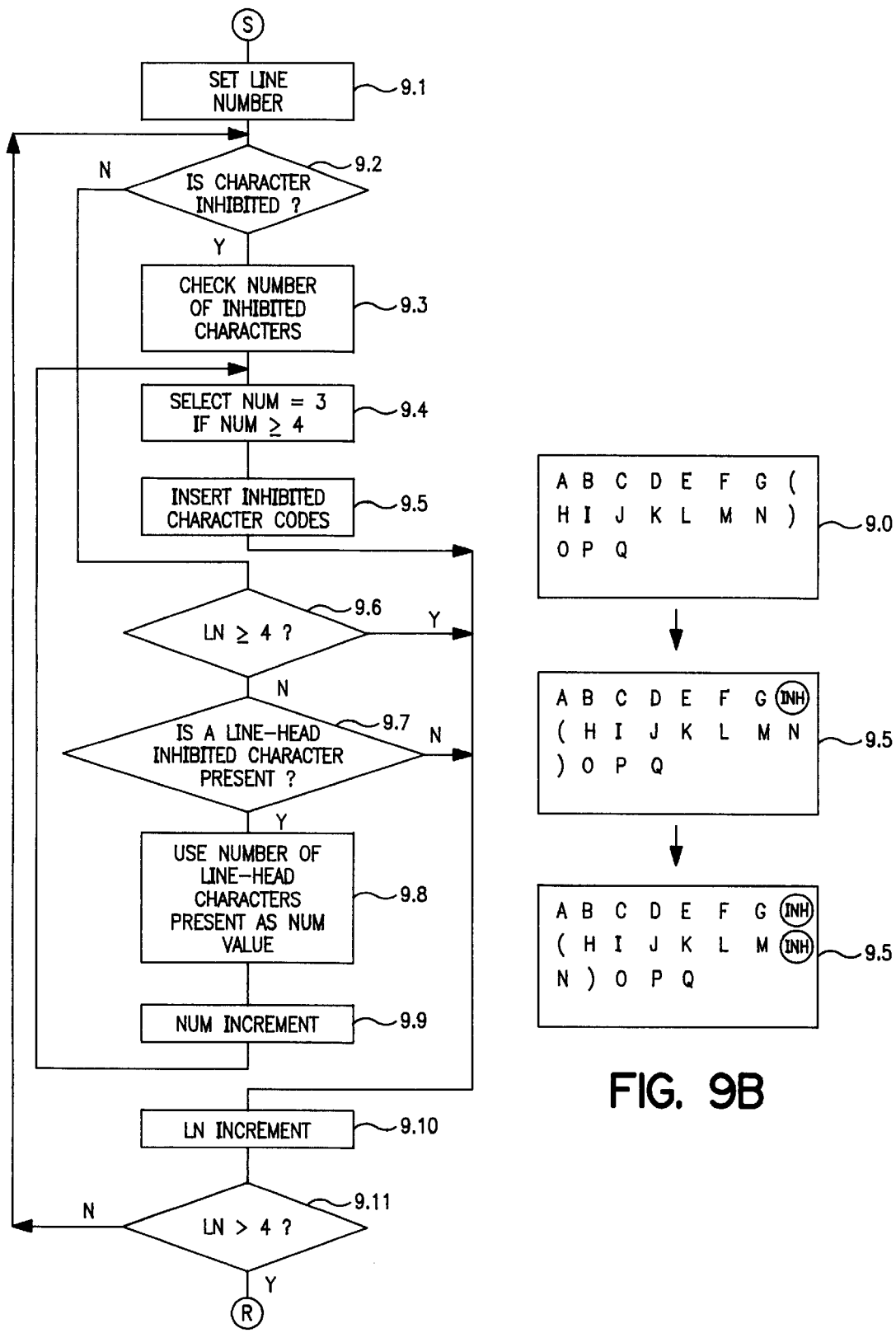
FIG. 9A is a flow chart showing the input procedure of an inhibited character processing input key.
FIG. 9B is a chart showing the manner of corresponding data shift.

For conducting automatic inhibited character processing on the series of characters entered in the above-mentioned manner, the inhibited character processing key is actuated whereby the inhibited characters positioned at the head or end of rows are shifted from such positions as shown in FIG. 9B and inhibited character codes, represented by [Inh], are inserted in said positioned.

Figure 7B:
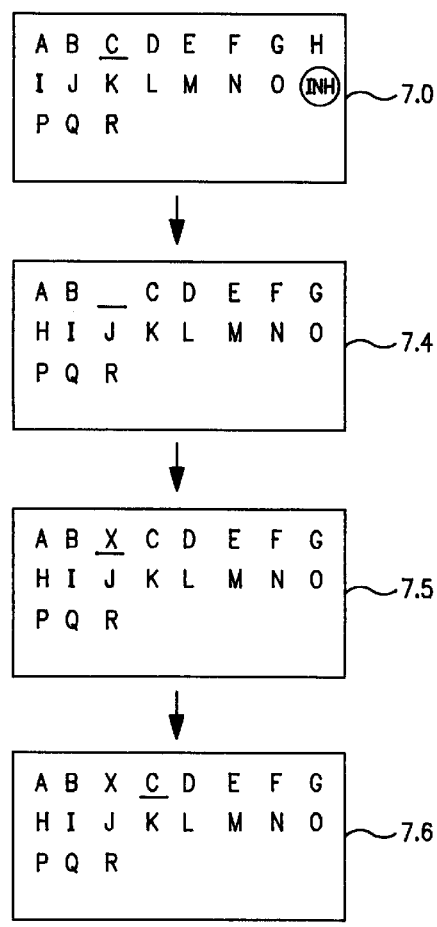
FIG. 7B is a chart showing the manner of data shift.
Figure 8A:
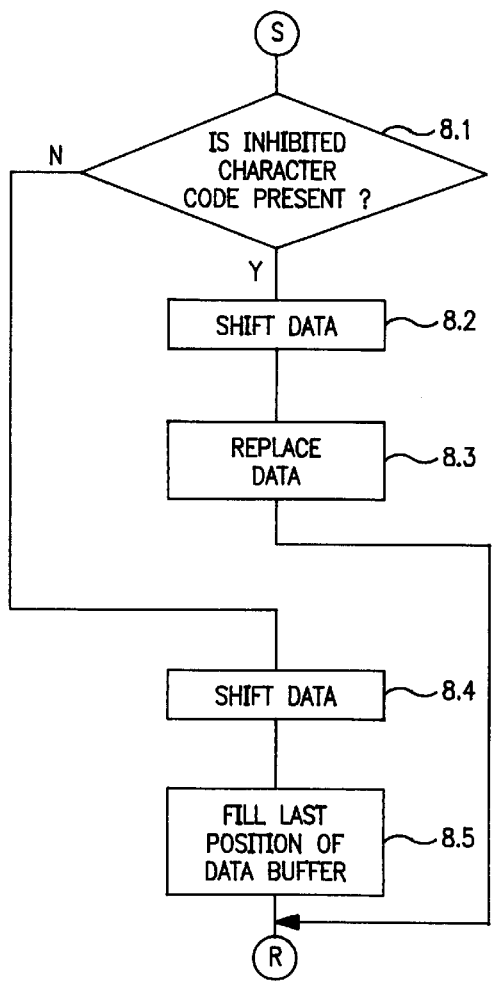
FIG. 8A is a flow chart showing the input procedure of a deletion key.
Figure 8B:
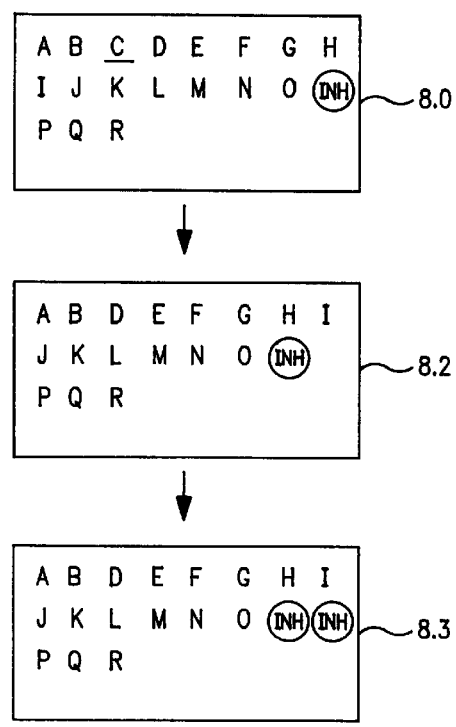
FIG. 8B is a chart showing the manner of data shift.

In case of inserting or deleting a character to or from thus processed characters, a particular processing is executed on said inhibited character code. When a character is inserted, the inhibited character code is replaced by the preceding row of characters as shown in FIG. 7B. On the other hand, when a character is deleted, a new inhibited character code is added as shown in FIG. 8B. In this manner it is intended to minimize the presence of characters in the inhibited positions resulting from an editing process after the aforementioned inhibited character processing.

The series of characters completed on the cathode ray tube is printed on paper upon actuation of a print key.

At the printing, the characters designated for uniform division or logotype printing are printed in respectively designated positions. In a row having an inhibited character mark [Inh], said mark is deleted at the printing operation and the remaining characters are arranged in uniformly divided manner within the left and right margin limits.

Figure 2:
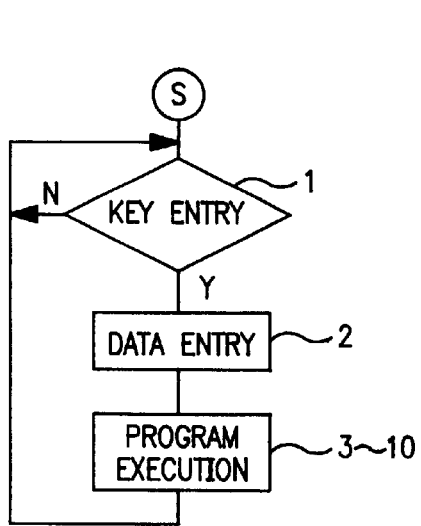
FIG. 2 is a flow chart showing the control precedure of a keyboard process.

Now reference is made to FIG. 1 showing an embodiment of the present invention in a block diagram, wherein there are provided:

a microprocessor CPU for calculation and logic processing;

an address bus line AB for transferring signals designating control loads;

a bidirectional data bus line DB for transferring various data;

a control bus line CB for transferring control signals to various control loads;

a keyboard KB comprising character information entry keys for entering alphanumeric characters, Japanese phonetic characters, symbols and other codes corresponding to special patterns defined by the user, and function entry keys including an initializing key, an overwrite key, an insertion key, cursor keys, a deletion key, an inhibited character processing key and a print key;

a cathode ray tube controller CRTC for displaying the character data stored in a data buffer DBUF to be explained later in character patterns in 8 columns and 4 rows on a cathode ray tube of the display unit to be explained later, and for displaying a cursor on said cathode ray tube in a position corresponding to the data stored in a cursor register CR to be explained later;

a cursor register CR for storing the position data of the cursor to be displayed on said cathode ray tube;

a data DBuF for storing the data entered from the keyboard KB and having a capacity for storing character information of 8 columns times 4 lines or rows;

a cathode ray tube CRT for displaying character information and cursor;

a character generator CG for displaying characters on the cathode ray tube CRT, and also for converting character codes into character patterns at the printout, and storing 9×7 dot matrix character patterns for these purposes;

a dot printer PRT having a thermal printing head of 9×1 dot matrix (9 dots in a vertical column) and controlled by a printer controller PRTC;

a printer controller PRTC adapted for controlling the printing operation of said printer PRT according to the character pattern information from the microprocessor CPU, controlling the lateral movement of the printer head according to the information from said microprocessor CPU and performing, in response to a carriage return instruction CF or a line feed instruction LF from the microprocessor CPU, a corresponding operation in the printer PRT, thereby performing the dot pitch control of the thermal head in the lateral direction and thereby printing each character with a 9×7 dot matrix through the lateral dot-pitch displacement of the 9×1 thermal head.

a random access memory RAM for temporary storage of various data, including registers LN, CN, AP, RP, NUM, CNS, CNE, SC, EC etc. and memories for the overwrite flag OWFG and other current parameters utilized by the microprocessor CPU during the execution of the program;

a read-only memory ROM for storing the sequence programs shown in FIG. 2 and thereafter; and a print pitch buffer PPB for storing, in dot units, the absolute addresses in lateral direction of the actual print positions of the print data stored in the data buffer DBuF.

In the following the function of the above-explained embodiment will be explained in detail, while making reference to FIGS. 2–19.

At first there will be explained the meaning of various parameters and symbols employed in the following description, which will also be used to indicate the corresponding registers:

LN: a current parameter indicating the line or row number;

CN: a current parameter indicating the column number;

$C_{LN,CN}$: a code in the data buffer DBuF corresponding to a line LN and a column CN;

$A_{LN,CN}$: a number in the print pitch buffer PPB corresponding to a line LN and a column CN, indicating the lateral print position of $C_{LN,CN}$ in dot unit;

NUM: a parameter indicating the number of characters;

CNS: a starting column number of the area to be uniformly divided;

CNE: an ending column number of the area to be uniformly divided;

SC: a starting column number of the character series to be uniformly divided;

EC: an ending column number of the character series to be uniformly divided;

AP: quotient

RP: residual

In response to a key actuation in the keyboard, KB, executed is a keyboard program shown in FIG. 2, which consists of the steps:

1: Key entry from keyboard?

2: Data entry from keyboard; and 3 to 10: Program execution according to the entered data.

These steps will be further explained in the following. The present keyboard program is activated at the start of power supply, and the data entry from the keyboard KB is detected in the Step 1. In the presence of data entry the program proceeds to the Step 2 for receiving thus entered data, and executes various programs in the Steps 3 to 10 according thus entered data. More specifically, there is executed an initializing key entry program (3) shown in FIG. 3 in case of an entry from the initializing key; an overwrite key entry program (4) shown in FIG. 4 in case of entry from the overwrite key; an insertion key entry program (5) shown in FIG. 5 in case of entry from the insertion key; a cursor key entry program (6) shown in FIG. 6 in case of entry from the cursor keys; a character key entry program (7) shown in FIG. 7A in case of an entry from the character keys, logotype key or uniform division key; a deletion key entry program (8) shown in FIG. 8A in case of entry from the deletion key; an inhibited character process key entry program (9) shown in FIG. 9A in case of entry from the inhibited character process key; or a print key entry program (10) shown in FIG. 10 in case of entry from the print key.

Figures 3, 4:
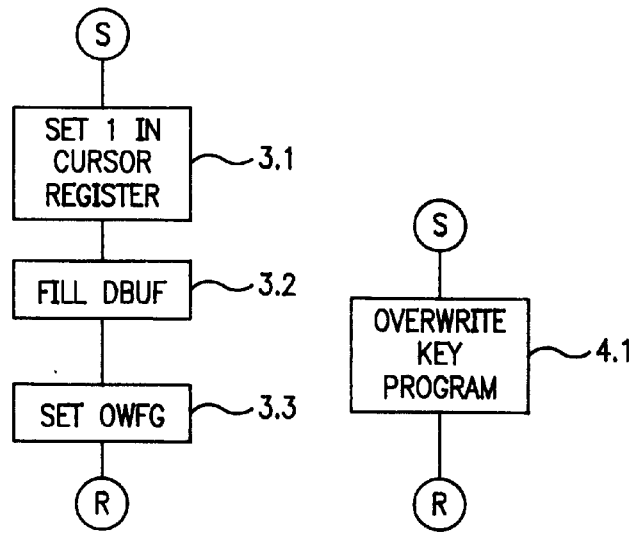
FIG. 3 is a flow chart showing the input procedure of an initializing key.
FIG. 4 is a flow chart showing the input procedure of an overwrite key.
Figure 5:
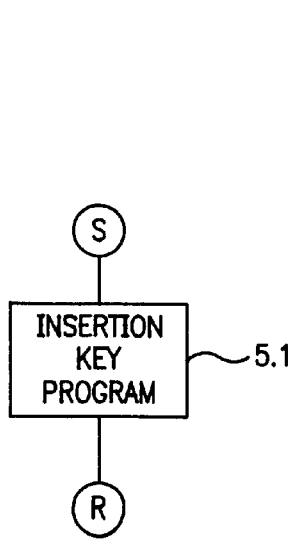
FIG. 5 is a flow chart showing the input procedure of an insertion key.

In case the initializing key is actuated, the program proceeds from the Step 2 to the initializing key entry program shown in FIG. 3, which consists of the steps:

3.1: Set "1" in the cursor register;

3.2: Fill data buffer DBUF with space codes; and 3.3: Set overwrite flag OWFG.

Functions of these steps are as follows:

3.1: Prior to the start of signal entry the initializing key is always actuated to execute the initializing key entry program, whereby data "1" is set in the cursor register to shift the cursor to the upper left corner of the cathode ray tube;

3.2: Fill the data buffer DBUF with space codes to clear the screen of the cathode ray tube; and 3.3: Set the overwrite flag.

Upon completion of the above-mentioned steps the program returns to the original state. In case the overwrite key is actuated, the program sets the overwrite flag LWFG to "1" and returns to the key entry stand-by state.

In case the insertion key is actuated, the program resets the overwrite flag and returns to the key entry stand-by state.

Figure 6:
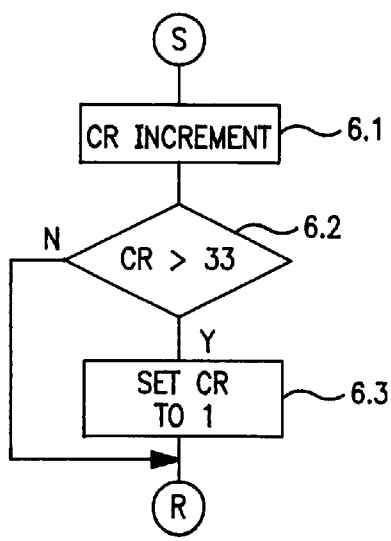
FIG. 6 is a flow chart showing the input procedure of a cursor key.

In case the cursor key is actuated, executed is the program shown in FIG. 6, which consists of the steps:

6.1: Cursor register CR increment;

6.2: Cursor register CR≧33?; and 6.3: Set cursor register CR to "1":

whereby the cursor is step advanced. When it reaches the lower right corner of the cathode ray tube, it is then shifted to the upper left corner.

Figure 7A:
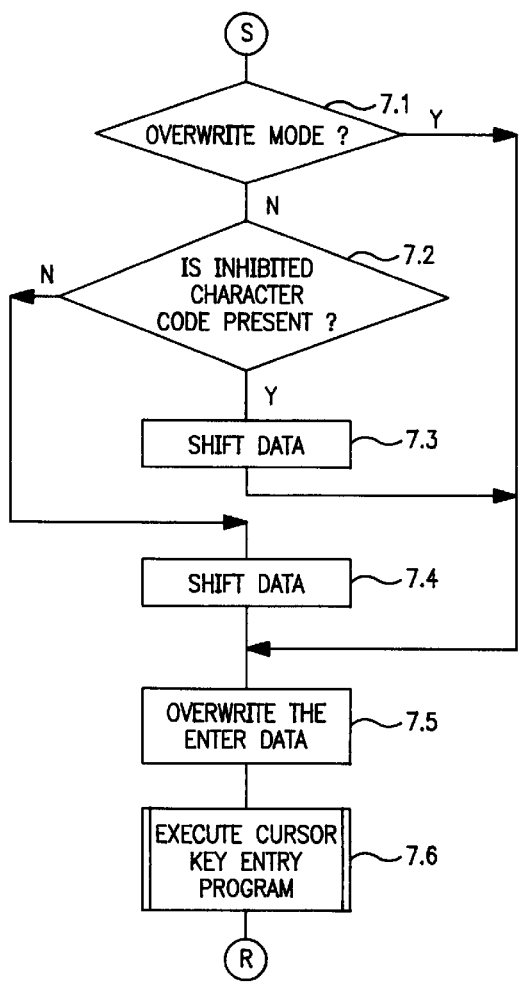
FIG. 7A is a flow chart showing the input procedure of a character key.

In case a character key is actuated, there is executed the program shown in FIG. 7A which consists of the steps:

7.1: Overwrite mode (OWFG=1)?

7.2: Is inhibited character code present after the cursor position?

7.3: Shift all the data to the right, starting from the cursor position to a position immediately preceding said inhibited character code;

7.4: Shift all the data to the right, starting from the cursor position;

7.5: Overwrite the entered data in the cursor position; and 7.6: Execute cursor key entry program (6).

Functions of these steps are as follows:

7.1: The executed program differs according to whether the overwrite mode or the insertion mode is selected. In the former case where the overwrite flag is set, the program proceeds to the Step 7.5. In the latter case where the overwrite flag is reset, the program proceeds to the Step 7.2.

7.2: The program proceeds to the Step 7.3 or 7.4 respectively when the inhibited character code is present or absent in the data following the cursor position.

7.3: For the purpose of character insertion, the existing characters are shifted to the back by one character, starting from the cursor position to the succeeding first inhibited character code, whereby said code is annihilated because of said shifting. Thereafter the program proceeds to the Step 7.5.

7.4: All the characters starting from the cursor position are shifted to the back by one character, and the last character is discarded.

7.5: The entered data are written into the cursor position.

7.6: The cursor key entry program (6) is executed for step advancing the cursor position.

FIG. 7B shows an example of character insertion, wherein, as shown in a diagram corresponding to the Step 7.4, the inhibited character code is replaced and the shifting does not affect the characters present subsequent to said code. The numbers shown in FIG. 7B or ensuing drawings with suffix B correspond to the steps in FIG. 7A or the drawings with suffix A.

In case the deletion key is actuated, executed is the program shown in FIG. 8 which consists of the following steps:

8.1: Is inhibited character code present after the cursor position?

8.2: Shift all the data in data buffer to the front by one character, starting from a position next to the cursor position to the position of said inhibited character code;

8.3: Replace the content of data buffer corresponding to the former position of inhibited character code with an inhibited character code;

8.4: Shift all the data in data buffer to the front by one character, starting from a position next to the cursor position; and 8.5: Fill the last position of data buffer with a space code.

Functions of these steps are as follows:

8.1: The program proceeds to the Step 8.2 or 8.4 respectively when the inhibited character code is present or absent in the data following the cursor position.

8.2: All the characters are shifted to the front by one character, starting from a position next to the cursor position to the position of said inhibited character code. The character at the cursor position is deleted.

8.3: The content of data buffer at the former position of said inhibited character code is replaced by an inhibited character code, whereby there will appear plural inhibited character codes in succession. The program returns to the original state.

8.4: All the data in the data buffer are shifted to the front by one character, starting from a position next to the cursor position. The character at the cursor position is deleted.

8.5: The last position of the data buffer is filled with a space code.

FIG. 8B shows an example of the deletion key entry program, wherein there are generated plural inhibited character codes as shown in a diagram corresponding to the Step 8.3.

In case the inhibited character process key is actuated, there is executed a program shown in FIG. 9A, which consists of the following steps:

9.1: Set the line number of cursor position in the register LN;

9.2: Is a character inhibited for line end present at a line end?

9.3: Check the number of line-end inhibited characters present in succession at the line end, and use said number as NUM;

9.4: Select NUM=3 if said number is equal to or larger than 4;

9.5: Insert the inhibited character codes of a number NUM for the line LN at a column position 9—NUM;

9.6: LN≧4?

9.7: Is a line-head inhibited character present at the head of line [LN+1]?

9.8: Check the number of line-head inhibited characters present in succession at the head of line LN, and use said number as NUM;

9.9: NUM increment;

9.10: LN increment; and 9.11: LN>4?

Functions of these steps are as follows:

9.1, 9.10 or 9.11: The steps 9.2 to 9.10 are repeated from a line of the cursor position to the last line.

9.2: Check is made if a line-end inhibited character is present at the line end. If present, the program proceeds to the Step 9.3 for executing the line-end inhibited character processing.

9.3: The number of line-end inhibited characters present in succession is checked, and said number is used as NUM.

9.4: NUM=3 is selected if said number is equal to or larger than 4. Thus the inhibited character processing is conducted for three characters at maximum.

9.5: Inhibited character codes of a number indicated by NUM are inserted at a column position indicated by 9—NUM, where "9" is the number of characters in a line plus one. The inserting program is identical with that shown in FIG. 7A. The program then proceeds to the Step 9.10.

9.6: Check is made if a next line exists. If it exists, there may be required the inhibited character processing for the line head. On the other hand, if the next line does not exist, such processing is not required and the program proceeds to the Step 9.10.

9.7: Check is made if a line-head inhibited character is present at the line head. If present, the program proceeds to the Step 9.8 for executing the inhibited character processing. If absent, the program proceeds to the Step 9.10.

9.8: Check is made if line-head inhibited characters are present at the end of present line, and the number of said characters is used as NUM.

9.9: NUM increment is conducted, and the program proceeds to the Step 9.4 where the NUM represents the number of characters to be subjected to the inhibited character processing.

FIG. 9B, the diagram in the center indicates a state after the line-end inhibited character processing for the first line, and the diagram at the bottom indicates a state after the line-head inhibited character processing for the second line.

In case the print key is actuated, there is executed a program shown in FIG. 10, which consists of the following processes:

10.1 Pitch determining process; and 10.2: Printout process.

Functions of these steps are as follows:

10.1: Lateral pitch of the information to be printed is determined.

10.2: Information stored in the data buffer is printed according to thus determined pitch.

The Step 10.1 shown in FIG. 10 is further composed of the following steps, as shown in FIG. 11A:

10.1.1: Register LN=1;

10.1.2: Standard pitch determining process;

10.1.3: Uniformly divided pitch determining process;

10.1.4: Logotype pitch determining process;

10.1.5: Inhibited character processing pitch determining process;

10.1.6: Register LN increment; and 10.1.7: Is process completed for all the lines?

Functions of these steps are as follows:

10.1.1, 10.1.6 and 10.1.7: Lateral pitch is determined for each line from the first to the last line.

10.1.2: Standard pitch determining process to be explained later.

10.1.3: Uniformly divided pitch determining process to be explained later.

10.1.4: Logotype pitch (or proportionally-spaced) determining process to be explained later.

10.1.5: Inhibited character processing pitch determining process to be explained later.

Figure 11B:
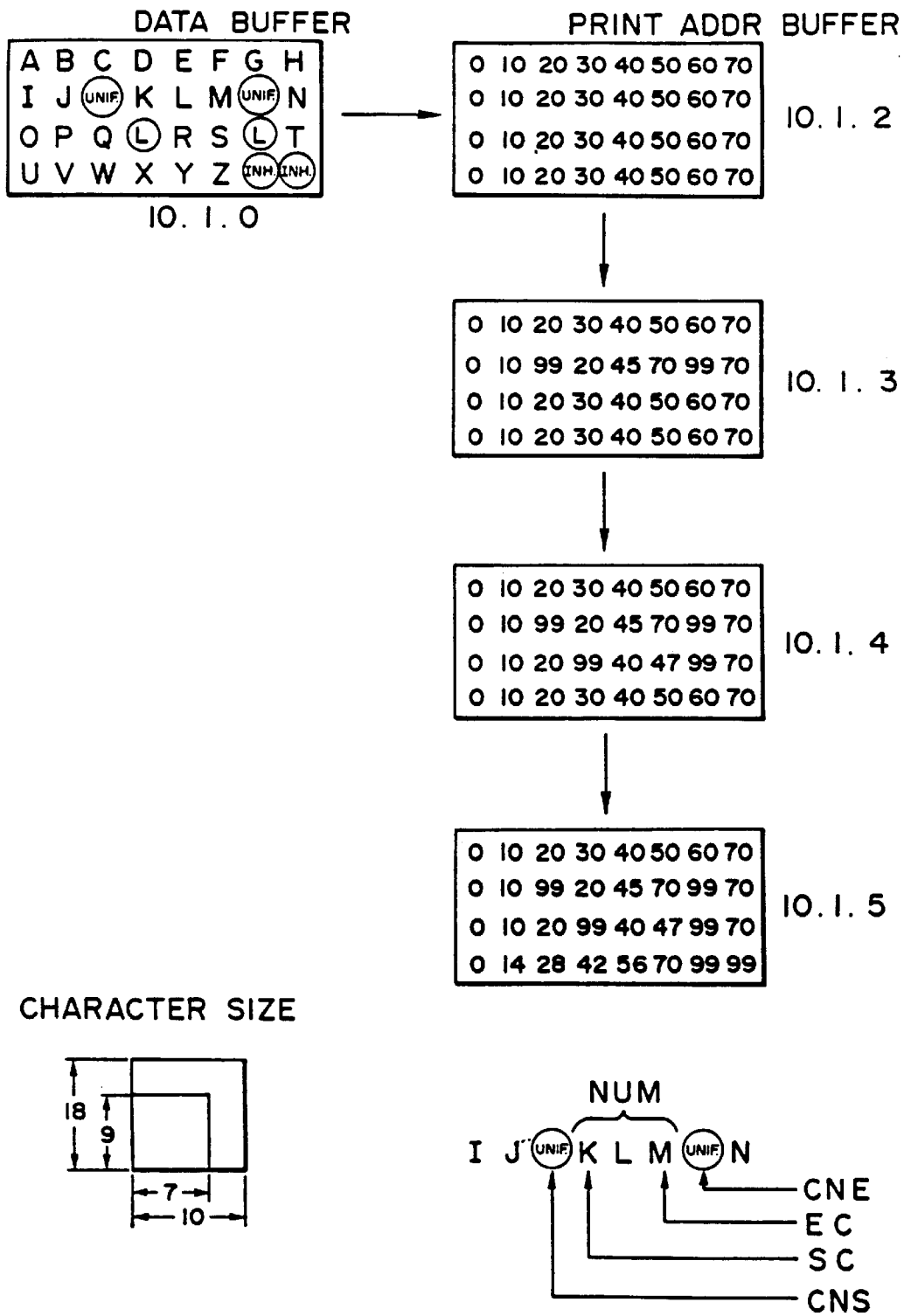
FIG. 11B is a chart showing the manner of corresponding data shift.

FIG. 11B shows an example of the pitch determining process, wherein the data stored in the data buffer are represented by a diagram 10.1.0. A diagram 10.1.2 shows the contents of the print pitch buffer PPB after the standard pitch determining process wherein the numbers indicate the lateral absolute addresses of the printing of character codes in the data buffer DBuF. In the present embodiment each character is composed of a 9×7 dot matrix which is printed with a lateral standard pitch of 10 dots. For this reason the lateral absolute addresses in the print pitch buffer PPB assume the values shown in the diagram 10.1.2. A diagram 10.1.3 shows a state after the print pitch buffer PPB is corrected by uniform division process for the second line, whereby the print positions for the characters K, L and M are corrected. A code "99" in the print pitch buffer indicates that the printing is not required.

Thus the character K, to be printed at the starting position of the uniformly divided area, has a lateral absolute print address of 20.

The character M, to be printed at the ending position of said area, has an address of 70.

The character L, to be printed in the center between the characters K and M, has an address of 45.

A diagram 10.1.4 shows the state of the print pitch buffer after correction for the logotype printing in the third line, wherein the character R remains in the original position but the character S changes the address thereof to 47 as it is to be printed close to the character R.

A diagram 10.1.5 shows the state of the print pitch buffer PPB after the correction for the inhibited character processing for the fourth line, wherein the character U remains in the original position but the character Z changes its address to 70, and the characters between U and Z are uniformly distributed therebetween.

The aforementioned standard pitch determining step 10.1.2 shown in FIG. 11A is composed of the following step as shown in FIG. 12:

10.1.2.1: $A_{LN,CN}=10\times(CN-1)$ (CN=1, 2, 3, . . . , 8)

The lateral address of the print position of each character is calculated in dot units for a standard pitch of 10 pitch per character from the above-mentioned step and is stored in the print pitch buffer PPB.

Figure 13:
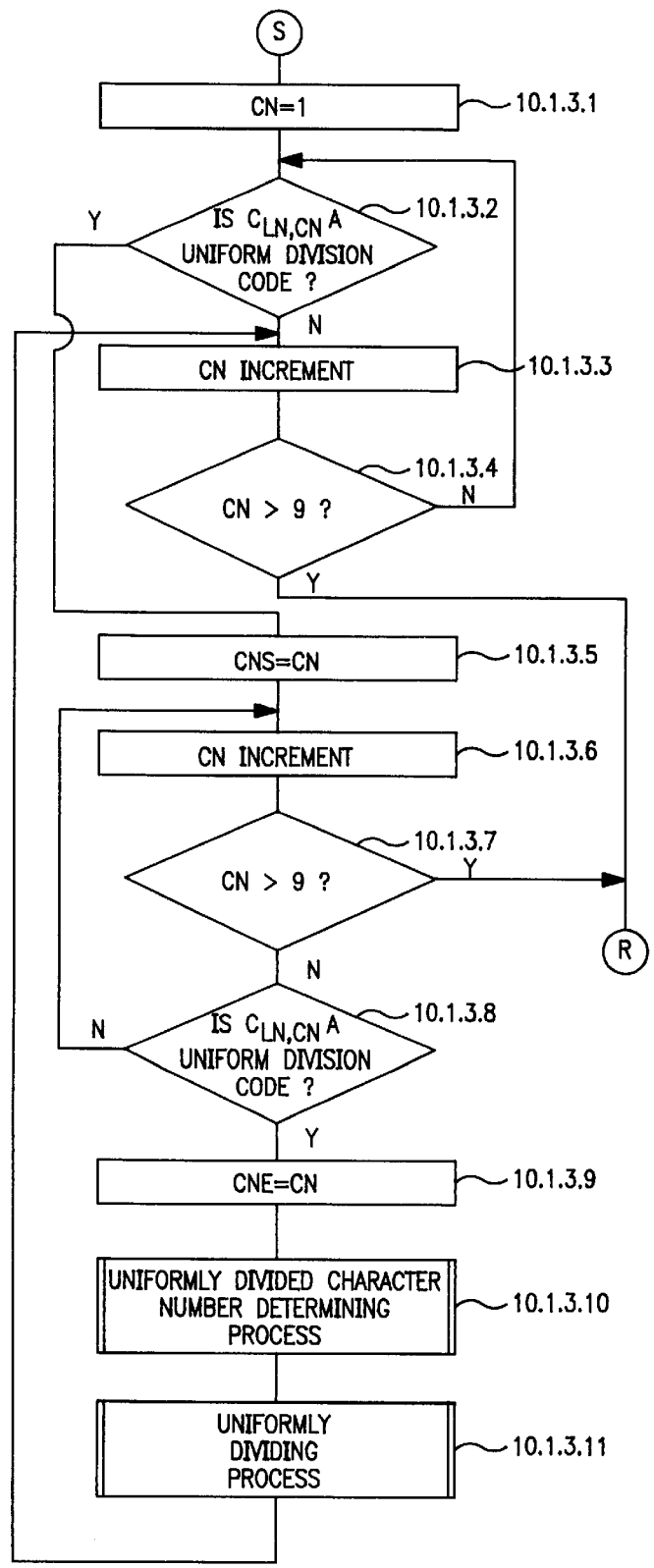
FIG. 13 is a flow chart showing the procedure for determining a uniformly divided pitch.

The aforementioned uniformly divided pitch determining process 10.1.3 is composed of the following steps as shown in FIG. 13:

10.1.3.1: CN=1;

10.1.3.2: Is $C_{LN,CN}$ a uniform division code?

10.1.3.3: CN increment;

10.1.3.4: CN>9?

10.1.3.5: CNS=CN;

10.1.3.6: CN increment;

10.1.3.7: CN>9?

10.1.3.8: Is $C_{LN,CN}$ a uniform division code?

10.1.3.9: CNE=CN;

10.1.3.10: Uniformly divided character number determining process; and 10.1.3.11: Uniformly dividing process:

wherein $C_{LN,CN}$ is a code in the data buffer DBuF for a line number LN and a column number CN, and CN is the column number.

Functions of these steps are as follows:

10.1.3.1–10.1.3.5: At first the starting position of the area to be uniformly divided, or the position of the first uniform division code, is set in CNS. The program returns to the original state from the Step 10.1.3.4 if no uniform division code is located.

10.1.3.6–10.1.3.9: The ending position of the area to be uniformly divided, or the position of the second uniform division code, is set in CNE. The program returns from the Step 10.1.3.7 if no uniform division code is located.

10.1.3.10: The number NUM of characters to be uniformly divided is determined from the starting column SC and the ending column EC according to the uniformly divided character number step to be explained further in the following.

10.1.3.11: Uniformly dividing process for correcting the values in the print pitch buffer PPB, which will be explained further in the following, is executed from the head to the end of each line.

Figure 14:
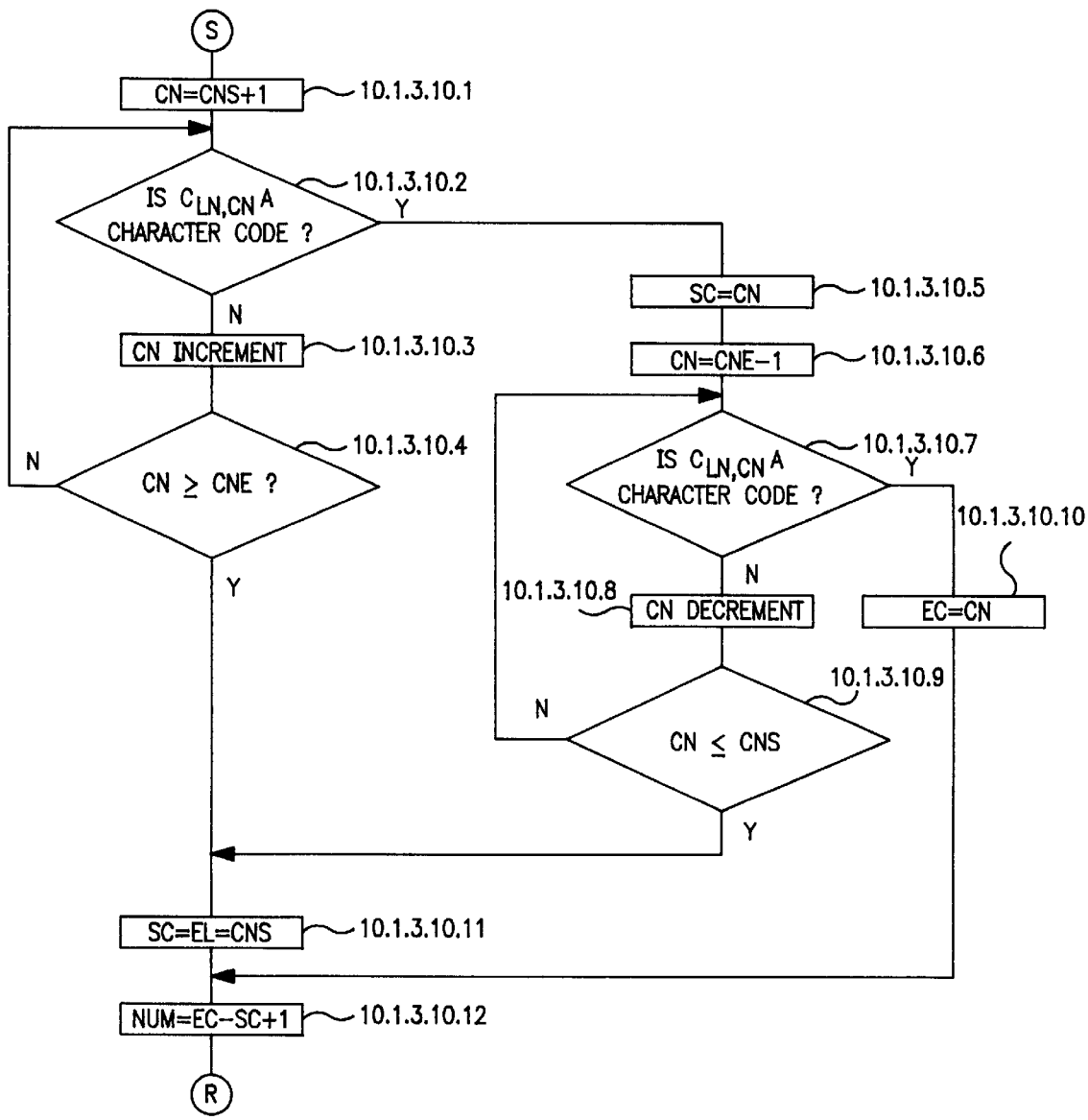
FIG. 14 is a flow chart showing the procedure for determining a uniformly divided number of characters.

The aforementioned uniformly divided character number determining process 10.1.3.10 shown in FIG. 13 is composed of the following steps, as shown in FIG. 14:

10.1.3.10.1: CN=CNS+1;

10.1.3.10.2: Is $C_{LN,CN}$ a character code?

10.1.3.10.3: CN increment;

10.1.3.10.4: CN$\geq$CNE;

10.1.3.10.5: SC=CN;

10.1.3.10.6: CN=CNE−1;

10.1.3.10.7: Is $C_{LN,CN}$ a character code?

10.1.3.10.8: CN decrement;

10.1.3.10.9: CN$\leq$CNS;

10.1.3.10.10: EC=CN;

10.1.3.10.11: SC=EC=CNS; and 10.1.3.10.12: NUM=EC−SC+1.

Functions of these steps are as follows:

10.1.3.10.1–10.1.3.10.5: The leading end of the character series to be uniformly divided in the area of uniform division defined by CNS and CNE is located (10.1.3.10.2) and set in SC (10.1.3.10.5). Said leading end shall be defined by the position of a first code other than the space code. If such series of characters is not found, the program proceeds to the Step 10.1.3.10.11.

10.1.3.10.6–10.1.3.10.10: The trailing end of the character series to be uniformly divided in the area of uniform division is found (10.1.3.10.7) and set in EC (10.1.3.10.10). Said trailing end shall be defined by the position of a first code from the end of said area other than the space code. The program proceeds to the Step 10.1.3.10.11 if such series of characters is not found, and otherwise proceeds to the Step 10.1.3.10.12.

10.1.3.10.11: This step is encountered if only space codes are found in said area. A condition SC=EC=CNS is temporarily set though the uniform division becomes meaningless in this case.

10.1.3.10.12: The number NUM of characters to be uniformly divided in said area of uniform division is determined according to the equation: NUM=EC−SC+1.

Figure 15:
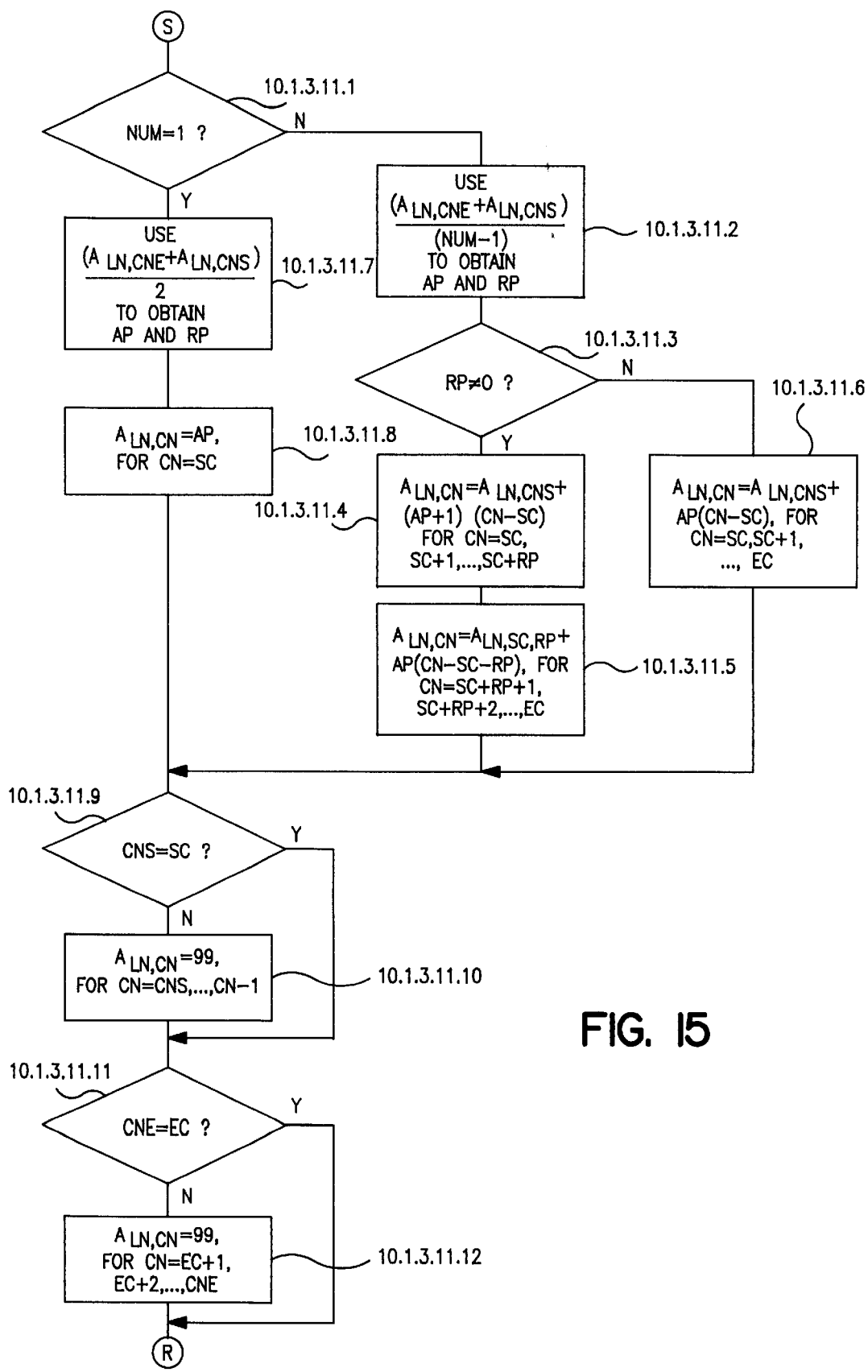
FIG. 15 is a flow chart showing the procedure of uniform division.

The aforementioned uniformly divising step 10.1.3.11 shown in FIG. 13 is further composed of the following steps as shown in FIG. 15:

10.1.3.11.1: NUM=1?

10.1.3.11.2: Divide $A_{LN,CNE}-A_{LN,CNS}$ with NUM−1 to obtain the quotient AP and the residual RP;

10.1.3.11.3: RP$\neq$0?

10.1.3.11.4: $A_{LN,CN}=A_{LN,CNS}+(AP+1)\times(CN-SC)$ (CN= SC, SC+1, . . . , SC+RP);

10.1.3.11.5: $A_{LN,CN}=A_{LN,SC+RP}+AP\times(CN-SC-RP)$ (CN= SC+RP+1, SC+RP+2, . . . , EC);

10.1.3.11.6: $A_{LN,CN}=A_{LN,CNS}+AP\times(CN-SC)$ (CN=SC, SC+1, . . . , EC);

10.1.3.11.7: Divide $A_{LN,CNE}+A_{LN,CNS}$ with 2 to obtain the quotient AP and the residual RP;

10.1.3.11.8: $A_{LN,CN}=AP$ (CN=SC);

10.1.3.11.9: CNS=SC?

10.1.3.11.10: $A_{LN,CN}$=99 (CN=CNS, ..., SC−1);

10.1.3.11.11: CNE=EC? and 10.1.3.11.12: $A_{LN,CN}$=99 (CN=EC+1, EC+2, ..., CNE).

Functions of these steps are as follows:

10.1.3.11.1: The program proceeds to the Step 10.1.3.11.7 when the number of characters to be uniformly divided is one, and otherwise proceeds to the Step 10.1.3.11.2.

10.1.3.11.2: The size of the area of uniform division ($A_{LN,CNE}-A_{LN,CNS}$) is divided with the number of characters to be uniformly divided minus one to obtain the quotient AP and the resudual RP.

10.1.3.11.3: The program proceeds to the Step 10.1.3.11.4 or 10.1.3.11.6 respectively when RP≠0 or RP=0.

10.1.3.11.4: In a series of characters to be uniformly divided, the first characters of a number RP are adjusted to a pitch AP+1, according to the relation: $A_{LN,CN}$=$A_{LN,CNS}$+(AP+1)×(CN−SC) (CN=SC, SC+1, ..., SC=RP).

10.1.3.11.5: The remaining characters are adjusted to a pitch AP, according to the relation: $A_{LN,CN}$=$A_{LN,SC+RP}$+AP×(CN−SC+RP) (CN=SC+RP+1, SC+RP+2, ..., EC).

Then the program proceeds to the Step 10.1.3.11.9.

10.1.3.11.6: All the characters to be uniformly divided are adjusted to a pitch AP, according to the relation: $A_{LN,CN}$=$A_{LN,CNS}$+AP×(CN−SC) (CN=SC, SC+1, ..., EC).

Then the program proceeds to the Step 10.1.3.11.9.

10.1.3.11.7: If the number NUM of the characters to be uniformly divided is one, such character is to be printed in the center, of which position is determined by dividing $A_{LN,CNE}$+$A_{LN,CNS}$ with 2 to obtain the quotient AP and the residual RP.

10.1.3.11.8: Said character is to be printed at the position AP according to: $A_{LN,CN}$=AP (CN=SC).

10.1.3.11.9: This step and the succeeding steps to 10.1.3.11.12 set all the printing positions to "99" in the area of uniform division other than those for the series of characters to be uniformly divided. At first check is made if a character is present other than that to be uniformly divided at the start position of said area. The program proceeds to the Step 10.1.3.11.11 if CNS=SC indicating the absence of such character, or to the Step 10.1.3.11.10 if CNS≠SC indicating the presence of such character.

10.1.3.11.10: All the printing positions are set to "99" other than the character not to be uniformly divided in the area of uniform division, according to the condition: $A_{LN,CN}$=99 (CN=CNS, ..., CN−1).

10.1.3.11.11: Check is made if a character not to be uniformly divided is present at the end of said area. The program returns in case of CNE=EC indicating the absence of such character, or proceeds to the Step 10.1.3.11.12 in case of CNE≠EC indicating the presence of such character.

10.1.3.11.12: All the printing positions are set to "99" other than the character not uniformly divided at the end of said area, according to: $A_{LN,CN}$=99 (CN=EC+1, EC+2, ..., CNE)

The uniformly dividing process is completed in this manner.

Figures 16, 17:
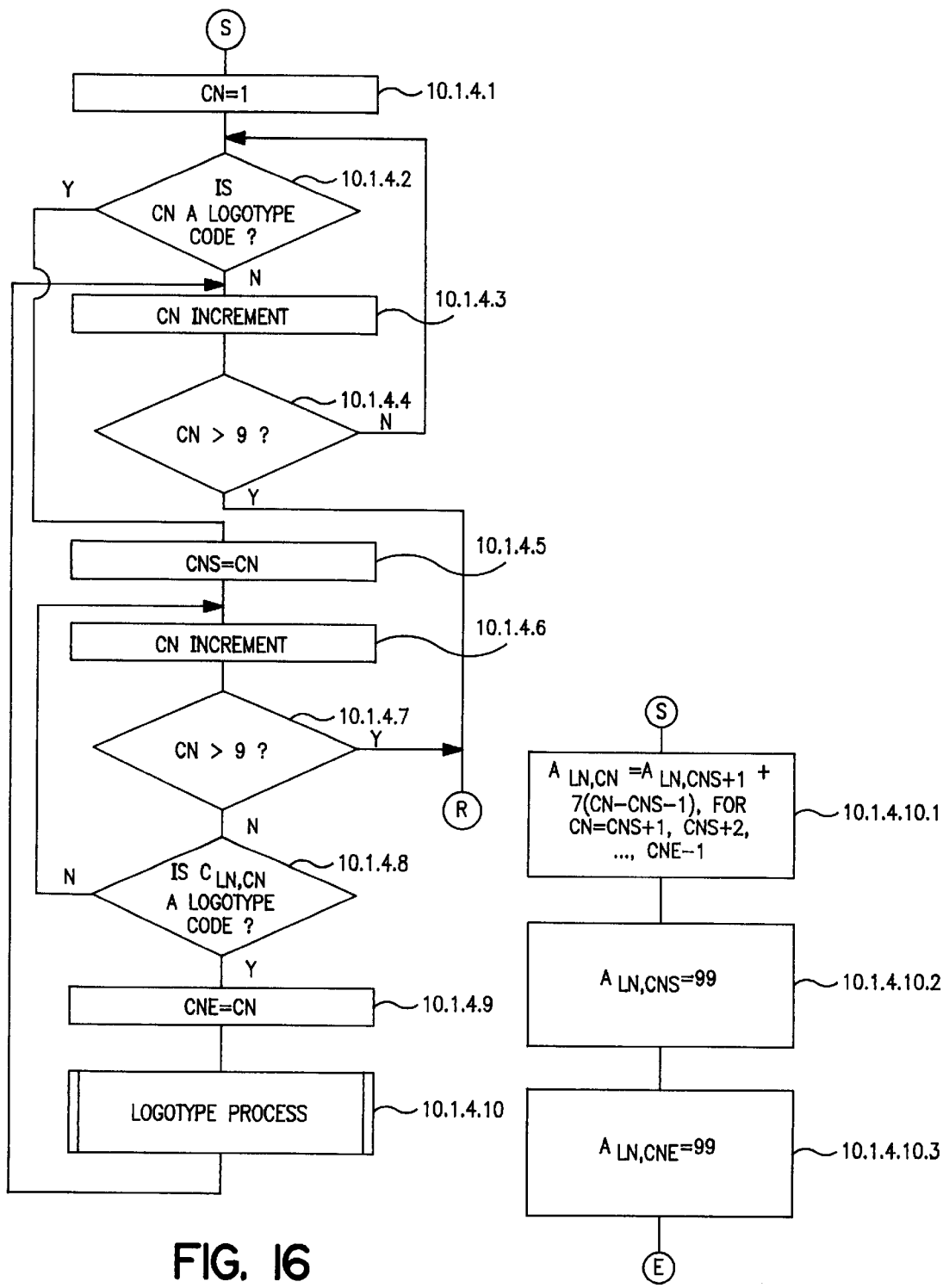
FIG. 16 is a flow chart showing the procedure for determining logo printing pitch.
FIG. 17 is a flow chart showing the logo process.

The aforementioned logotype pitch determining process 10.1.4 shown in FIG. 11 is further composed of the following steps, as shown in FIG. 16:

10.1.4.1: CN=1;

10.1.4.2: Is $C_{LN,CN}$ a logotype code?

10.1.4.3: CN increment;

10.1.4.4: CN>9?

10.1.4.5: CNS=CN;

10.1.4.6: CN increment;

10.1.4.7: CN>9?

10.1.4.8: Is $C_{LN,CN}$ a logotype code?

10.1.4.9: CNE=CN; and 10.1.4.10: logotype process.

Functions of these steps are as follows:

10.1.4.1–10.1.4.5: The starting position of the logotype area is searched from the head of line LN. The program returns if the starting position does not exist in said line (10.1.4.4). When said starting position is located (10.1.4.2) the number of the starting column is set in CNS (10.1.4.5).

10.1.4.6–10.1.4.9: The ending position of the logotype area is searched. The program returns if said ending position does not exist in said line (10.1.4.7). When said ending position is located (10.1.4.8) the number of the ending column is set in CNE (10.1.4.9).

10.1.4.10: The logotype process is conducted, in a manner as will be explained later, for determining the print position of the series of characters to be printed in logotype. Then the program proceeds to the Step 10.1.4.3 for searching another logotype area in said line.

The aforementioned logotype process shown in FIG. 16 is further composed of the following steps, as shown in FIG. 17:

10.1.4.10.1: $A_{LN,CN}$=$A_{LN,CNS+1}$+7×(CN−CNS−1) (CN=CNS+1, CNS+2, ..., CNE−1);

10.1.4.10.2: $A_{LN,CNS}$=99; and 10.1.4.10.3: $A_{LN,CNE}$=99.

Functions of these steps are as follows:

10.1.4.10.1: All characters present two logotype codes shall be subjected to logotype printing. The leading character of said series remains unchanged in the printing position, but each of the following characters is printed so as to be positioned close to the preceding character with a pitch of 7 dots which are equal to the lateral length of the character.

This relation is represented by:

$A_{LN,CN}$=$A_{LN,CNS+1}$+7×(CN−CNS−1), (CN=CNS+1, CNS+2, ..., CNE−1).

10.1.4.10.2–10.1.4.10.3: Code "99" is set in the print positions of the starting and ending logotype codes defining the logotype area.

Figure 18:
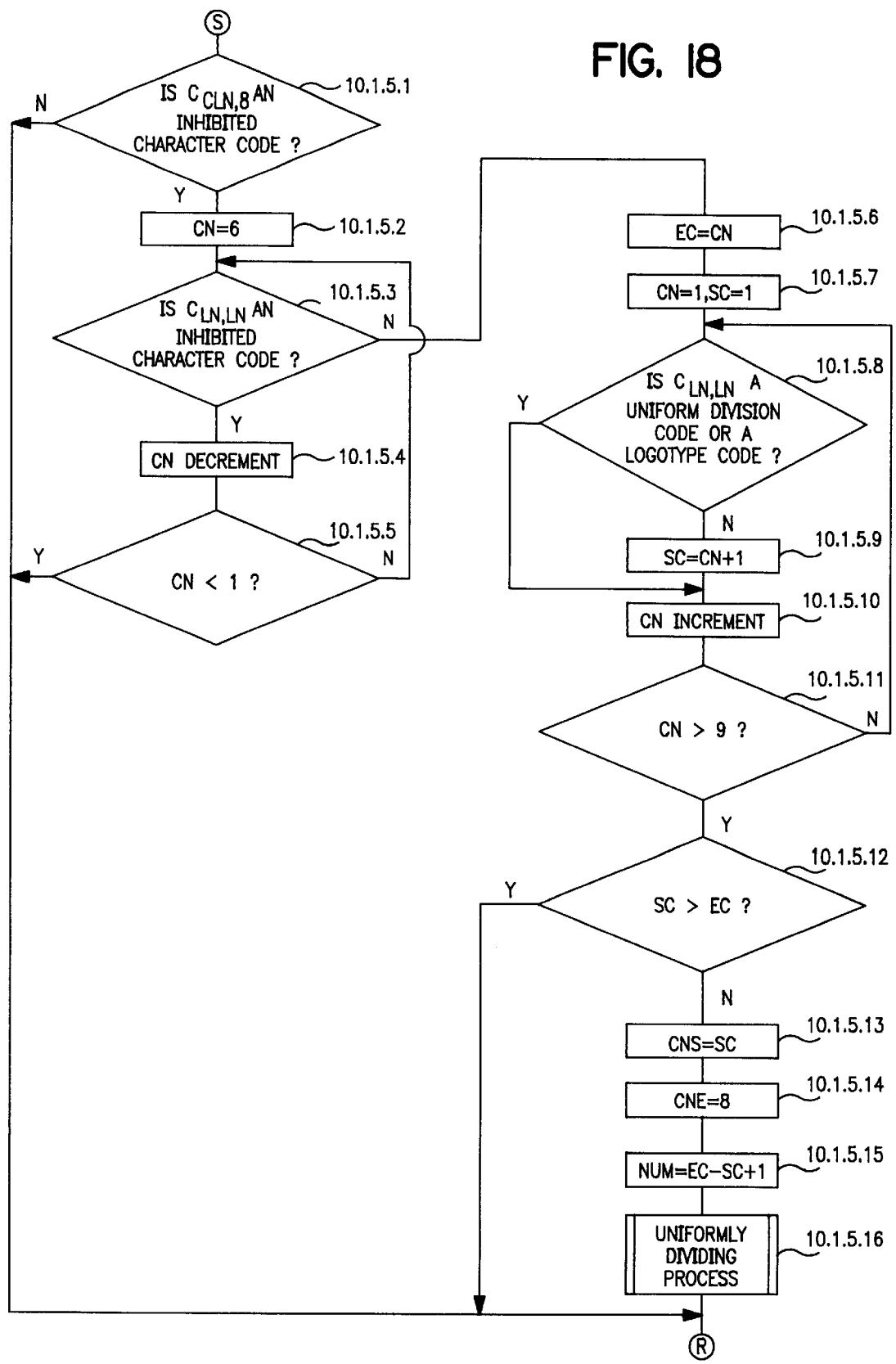
FIG. 18 is a flow chart showing the procedure for determining a character pitch in inhibited character processing; an FIG. 19 is a flow chart showing the printing procedure.

The inhibited character processing pitch determining process 10.1.5 shown in FIG. 11A is further composed of the following steps as shown in FIG. 18:

10.1.5.1: Is $C_{LN,8}$ an inhibited character code?

10.1.5.2: CN=6;

10.1.5.3: Is $C_{LN,LN}$ an inhibited character code?

10.1.5.4: CN decrement;

10.1.5.5: CN<1;

10.1.5.6: EC=CN;

10.1.5.7: CN=1, SC=1;

10.1.5.8: Is $C_{LN,LN}$ a uniform division code or a logotype code?

10.1.5.9: SC=CN+1;

10.1.5.10: CN increment;

10.1.5.11: CN>9?

10.1.5.12: SC>EC?

10.1.5.13: CNS=SC;

10.1.5.14: CNE=8;

10.1.5.15: NUM=EC−SC+1; and 10.1.5.16: Uniformly dividing process (10.1.3.11).

Functions of these steps are as follows:

10.1.5.1: Check is made if an inhibited character code is present at the line end, and, if absent, the program returns. If present, the program proceeds to the Step 10.1.5.2.

10.1.5.2–10.1.5.6: In case there is an inhibited character code or are plural inhibited character codes in succession, a position immediately preceding said code or codes is selected as the end of characters to be uniformly divided. Thus the first character code from the end other than the inhibited character code is located (10.1.5.3) and the column position thereof is set in EC (10.1.5.6).

10.1.5.7–10.1.5.11: The series of characters to be subjected to uniform division generally starts from the head of a line, but it starts from a position next to a uniform division code or a logotype code if such code is present in the middle of a line. Thus the character codes are checked from the head of said line for determining the starting position of the characters to be subjected to the uniform division (10.1.5.8). The starting column number SC of said characters is initially set at "1" but is renewed (10.1.5.9) if it is identified necessary (10.1.5.8).

10.1.5.12: SC is compared with EC, and, if SC≦EC, the program proceeds to the Step 10.1.5.13 as the uniform division step is possible. The program returns in case of SC>EC.

10.1.5.13: The starting column number of the uniformly divided area is set in CNS, i.e. CNS=SC.

10.1.5.14: The ending column number of the uniformly divided area is set in CNE, i.e. CNE=8.

10.1.5.15: The number of characters to be subjected to uniform division is calculated according to the equation:

NUM=EC−SC+1

10.1.5.16: The print positions of characters are determined according to the uniformly dividing step 10.1.3.11.

The inhibited character process pitch determining step is conducted in the above-mentioned manner.

Figure 19:
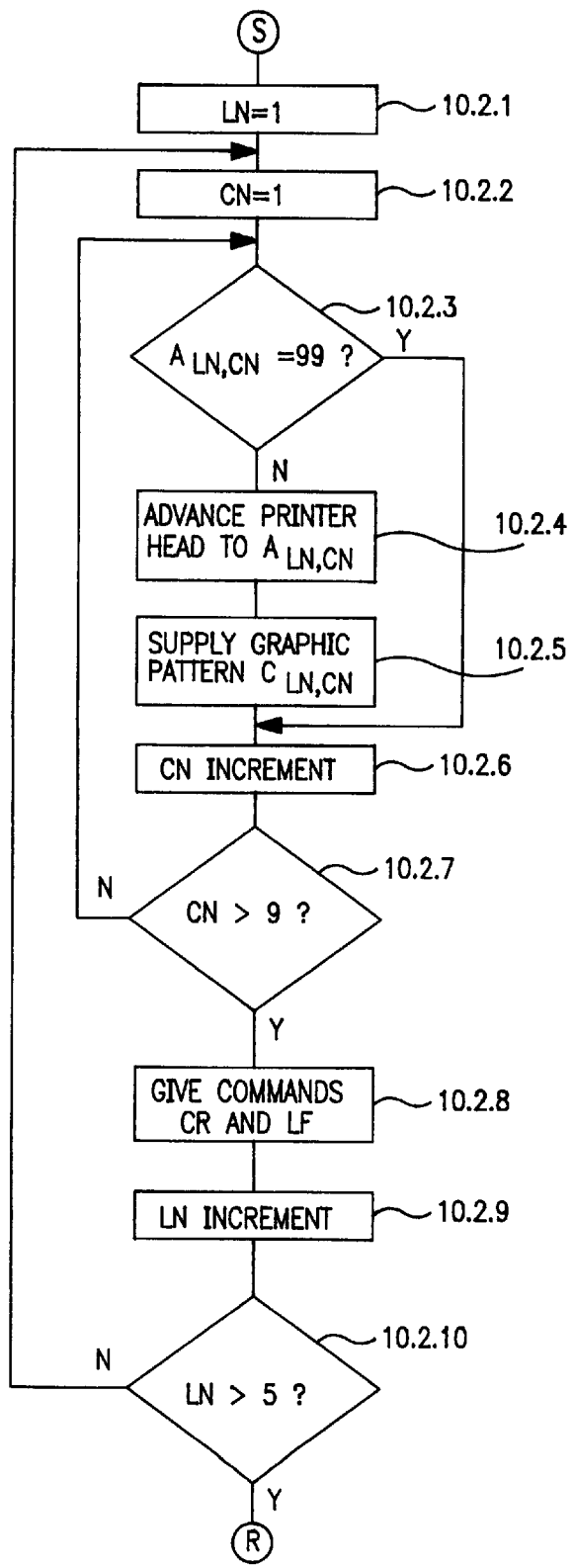

The print step 10.2 shown in FIG. 10 is further composed of the following steps, as shown in FIG. 19:

10.2.1: LN=1;

10.2.2: CN=1;

10.2.3: $A_{LN,CN}$=99?

10.2.4: Advance the printer head to a position represented by $A_{LN,CN}$;

10.2.5: Supply a graphic pattern represented by a code $C_{LN,CN}$ from the character generator CG to the printer;

10.2.6: CN increment;

10.2.7: CN>9?

10.2.8: Give commands CR and LF to the printer;

10.2.9: LN increment;

10.2.10: LN>5?

Functions of these steps are as follows:

10.2.1, 10.2.9 and 10.2.10: Print is made for each line from the first to the last line.

10.2.2, 10.2.6 and 10.2.7: Print is made for each character from the first to the last column.

10.2.3: A character having the code "99" is not printed, and the program thus proceeds to the Step 10.2.5. Otherwise it proceeds to the Step 10.2.3.

10.2.4: The printing head is advanced to the print position by a head advancing instruction given to the printer controller PRTC.

10.2.5: A character is printed by obtain a character pattern from the character generator CG corresponding to the character code ($C_{LN,CN}$) of said character, and supplying said pattern to the printer controller PRTC. Then the program proceeds to the Step 10.2.6.

10.2.8: CR and LF are instructed to the printer through the printer controller PRTC.

The print step is conducted in the above-mentioned manner.

The foregoing explains the manner of the word processing according to the present invention.

What I claim is:

1. A character processing apparatus comprising:

memory means for storing character information corresponding to a plurality of characters to be output across a plurality of lines;

control means for, when an inhibited character is at a head position of one line of the plurality of lines, shifting a last character in a previous line to the head position of the one line to move the inhibited character from the head of the one line;

deriving means for deriving positions at which characters are to be output in the previous line, so as to allot substantially equal space to a plurality of spacings among characters in the previous line after the last character has been shifted to the head position of the one line by said control means; and output means for outputting the plurality of characters corresponding to the character information stored in said memory means on the basis of positions derived by said deriving means.

2. An apparatus according to claim 1, further comprising input means for inputting the character information to be stored in said memory means.

3. An apparatus according to claim 2, wherein said input means comprises a keyboard.

4. An apparatus according to claim 1, wherein said output means comprises a printer.

5. An apparatus according to claim 1, further comprising display means for displaying data, wherein said control means inserts an inhibition code at a tail of the previous line after shifting the last character in the previous line to the head position of the one line, and said display means displays the characters in the previous line together with the inhibition code inserted by said control means.

6. A character processing method using a memory which stores character information corresponding to a plurality of characters to be output across a plurality of lines, said method comprising the steps of:

when an inhibited character is at a head position of one line of the plurality of lines, shifting a last character in a previous line to the head position of the one line to move the inhibited character from the head position of the one line;

deriving positions at which characters are to be output in the previous line, so as to allot substantially equal space to a plurality of spacings among characters in the previous line after the last character has been shifted to the head position of the one line in said shifting step; and outputting the plurality of characters corresponding to the character information stored in the memory on the basis of the derived positions.

7. A method according to claim 6, further comprising the step of inputting the character information to be stored in the memory.

8. A method according to claim 7, wherein a keyboard is used in said inputting step to input the character information.

9. A method according to claim 6, wherein said outputting step outputs the plurality of characters using a printer.

10. A method according to claim 6, further comprising the step of displaying data, wherein said shifting step includes inserting an inhibition code at a tail of the previous line after shifting the last character in the previous line to the head position of the one line, and said displaying step includes displays the characters in the previous line together with the inserted inhibition code.

11. A computer-usable medium storing computer-usable instructions for a character processing apparatus having a memory which stores character information corresponding to a plurality of characters to be output across a plurality of lines, said instructions comprising instructions for causing the apparatus to:

when an inhibited character is at a head position of one line of the plurality of lines, shift a last character in a previous line to the head position of the one line to move the inhibited character from the head position of the one line;

derive positions at which characters are to be output in the previous line, so as to allot substantially equal space to a plurality of spacings among characters in the previous line after the last character has been shifted to the head position of the one line; and output the plurality of characters corresponding to the character information stored in the memory on the basis of the derived positions.

12. A computer-usable medium according to claim 11, further comprising instructions for causing the apparatus to input the character information to be stored in the memory.

13. A computer-usable medium according to claim 12, wherein a keyboard is used to input the character information.

14. A computer-usable medium according to claim 11, wherein said output instructions cause the apparatus to output the plurality of characters using a printer.

15. A computer-usable medium according to claim 11, further comprising instructions to cause the apparatus to display data, wherein said shifting instructions cause the apparatus to insert an inhibition code at a tail of the previous line after shifting the last character in the previous line to the head position of the one line, and said displaying instructions cause the apparatus to display the characters in the previous line together with the inserted inhibition code.

* * * * *

UNITED STATES PATENT AND TRADEMARK OFFICE
CERTIFICATE OF CORRECTION

PATENT NO.  :  5,930,812

DATED       :  July 27, 1999

INVENTOR(S) :  KATSUMI MASAKI

It is certified that error appears in the above-identified patent and that said Letters Patent is hereby corrected as shown below:

COLUMN 2
Line 12, "characters form" should read --number of characters from--.

COLUMN 4
Line 37, "an" should read --and--.
Line 58, "reason" should read --reasons--.

COLUMN 5
Line 2, "reason" should read --reasons--.
Line 40, "positioned" should read --position--.

COLUMN 7
Line 30, "according" should read --according to--.

UNITED STATES PATENT AND TRADEMARK OFFICE
CERTIFICATE OF CORRECTION

PATENT NO. : 5,930,812

DATED : July 27, 1999

INVENTOR(S) : KATSUMI MASAKI

It is certified that error appears in the above-identified patent and that said Letters Patent is hereby corrected as shown below:

COLUMN 12
Line 50, "divising" should read --dividing--.

COLUMN 13
Line 13, "resudual" should read --residual--.
Line 41, "At" should read --A--.

COLUMN 17
Line 22, "displays" should read --displaying--.

Signed and Sealed this

Eleventh Day of July, 2000

*Attest:*

Q. TODD DICKINSON

*Attesting Officer*   *Director of Patents and Trademarks*